US012770533B2

(12) United States Patent
Kulkarni et al.

(10) Patent No.: US 12,770,533 B2
(45) Date of Patent: Oct. 20, 2026

(54) METHODS AND SYSTEMS FOR SIMULATING DEPOSITION OF INHALED DRUG ON LUNGS

(71) Applicant: CIPLA LIMITED, Mumbai (IN)

(72) Inventors: Nandan Kulkarni, Mulund West (IN); Geena Malhotra, Mumbai (IN)

(73) Assignee: CIPLA LIMITED, Mumbai (IN)

( * ) Notice: Subject to any disclaimer, the term of this patent is extended or adjusted under 35 U.S.C. 154(b) by 387 days.

(21) Appl. No.: 17/289,522

(22) PCT Filed: Apr. 24, 2020

(86) PCT No.: PCT/IN2020/050381
§ 371 (c)(1),
(2) Date: Apr. 28, 2021

(87) PCT Pub. No.: WO2020/217259
PCT Pub. Date: Oct. 29, 2020

(65) Prior Publication Data

US 2022/0036766 A1 Feb. 3, 2022

(30) Foreign Application Priority Data

Apr. 24, 2019 (IN) ............................ 201921016322

(51) Int. Cl.
*G09B 23/32* (2006.01)

(52) U.S. Cl.
CPC .................................... *G09B 23/32* (2013.01)

(58) Field of Classification Search
CPC ...... G09B 23/30; G09B 23/285; G09B 23/28; G09B 23/32; G09B 23/34; G09B 23/303; G09B 23/288; G09B 23/00
See application file for complete search history.

(56) References Cited

U.S. PATENT DOCUMENTS 4,092,845 A * 6/1978 Prodi ..................... G01N 15/00 73/28.01
4,167,070 A * 9/1979 Orden .................... G09B 23/32 434/272

(Continued)

FOREIGN PATENT DOCUMENTS

CA 3024430 A1 * 7/2019 ........... A61B 5/0836
CN 105427723 A * 3/2016

(Continued)

OTHER PUBLICATIONS

CN 107271337 A (Year: 2017).*

(Continued)

*Primary Examiner* — John E Simms, Jr.
*Assistant Examiner* — Amir A Klayman
(74) *Attorney, Agent, or Firm* — CANTOR COLBURN LLP

(57) ABSTRACT

An apparatus (100), a system (200), and a method (500) for simulating deposition of an inhaled drug on lungs of an individual are disclosed. The apparatus (100) includes a mouth-throat model (102), an inhalation device (104), and a breath simulator (106) connected to the mouth-throat model (102) for dispersing drug and respiration flow respectively in the mouth-throat model (102). The apparatus (100) also includes a controlling unit (108) in communication with the breath simulator (106) and the inhalation device (104) to detect the dispersion of the respiration flow and actuate the inhalation device (104) to disperse the drug. The respiration flow and the drug are uniformly mixed while passing through a mixing unit (110) formed downstream to the mouth-throat model (102) and the breath simulator (106). The mixture is then received by a lung cast model (112) formed downstream to the mixing unit (110) to accommodate deposition of the drug.

13 Claims, 5 Drawing Sheets

(56) References Cited

U.S. PATENT DOCUMENTS 4,484,577 A * 11/1984 Sackner ............ A61M 15/0086 128/203.29
4,790,305 A * 12/1988 Zoltan ............... A61M 15/0088 128/200.23
4,796,467 A * 1/1989 Burt ...................... G01M 3/027 128/200.24
5,062,423 A * 11/1991 Matson .................... A61D 7/04 128/207.15
5,178,138 A * 1/1993 Walstrom .......... A61M 15/0086 128/200.14
5,333,106 A * 7/1994 Lanpher ................. G09B 23/30 128/200.23
5,403,192 A * 4/1995 Kleinwaks ............. G09B 23/28 434/272
5,597,310 A * 1/1997 Edde ...................... G09B 23/30 434/262
5,772,442 A * 6/1998 Lampotang ............ G09B 23/28 434/262
6,296,490 B1 * 10/2001 Bowden ............... G09B 23/288 434/272
6,599,253 B1 * 7/2003 Baum .................. G01N 33/497 356/303
6,726,650 B2 * 4/2004 Schneider ............... B01F 31/10 604/82
6,874,501 B1 * 4/2005 Estetter ................ G09B 23/288 128/205.15
7,021,940 B2 * 4/2006 Morris ................... G09B 23/28 434/272
7,854,227 B2 * 12/2010 Djupesland ....... A61M 15/0098 128/203.18
7,959,443 B1 * 6/2011 Frembgen .............. G09B 23/28 434/262
8,196,483 B2 * 6/2012 Limbrick ............... G09B 23/32 73/866.4
8,348,673 B2 * 1/2013 Gerde .................... G09B 23/32 434/272
8,621,914 B2 * 1/2014 Montividas ............. G01M 3/02 73/40
8,985,100 B2 * 3/2015 Minocchieri ......... A61M 16/00 128/203.12
11,107,370 B2 * 8/2021 Minskoff ............... G09B 23/30
11,410,576 B2 * 8/2022 Fernandez ........... G09B 23/303
11,475,798 B2 * 10/2022 Chen ...................... G01N 30/02
11,694,578 B2 * 7/2023 Caron .................... G09B 23/32 434/268
11,915,610 B2 * 2/2024 Fernandez ........... G09B 23/303
2002/0117173 A1 * 8/2002 Lynn ................. A61M 16/0078 128/202.28
2004/0101814 A1 * 5/2004 Morris ................... G09B 23/28 434/268
2005/0066968 A1 * 3/2005 Shofner ................. A61B 5/411 128/204.18
2005/0168578 A1 * 8/2005 Gobush .............. A63B 69/3614 348/207.99
2006/0121430 A1 * 6/2006 Winnike ................ G09B 23/30 434/267
2006/0288805 A1 * 12/2006 Das ........................ G01N 33/15 73/866
2007/0065785 A1 * 3/2007 Wenske ............... G09B 23/288 434/86
2007/0142742 A1 * 6/2007 Aljuri .................... A61B 5/093 600/529
2007/0259322 A1 * 11/2007 Yuasa .................... A62B 27/00 434/262
2008/0286735 A1 * 11/2008 Cusano .................. G09B 23/30 434/267
2008/0305464 A1 * 12/2008 Lynn .................... G09B 23/288 434/265
2009/0110140 A1 * 4/2009 Krautim ............... A61N 5/1048 378/18
2009/0173173 A1 * 7/2009 Limbrick ............... G09B 23/32 73/866.4
2010/0167251 A1 * 7/2010 Boutchko ............. A61B 5/055 434/267
2011/0045450 A1 * 2/2011 Nuttal .................... G09B 23/30 434/267
2012/0247235 A1 10/2012 Adamo et al.
2013/0108999 A1 * 5/2013 Gillies ................... G09B 23/30 434/272
2014/0099621 A1 * 4/2014 Fuchs .................. G09B 23/288 434/272
2014/0247450 A1 * 9/2014 Han ................... G01N 15/0211 356/338
2016/0217709 A1 * 7/2016 Minskoff ............... G09B 23/30
2016/0349168 A1 * 12/2016 Takasu ............... G01N 15/1459
2016/0365007 A1 * 12/2016 Black ................... G09B 23/281
2020/0110427 A1 * 4/2020 Berry ................... G05D 7/0617
2020/0160752 A1 5/2020 Lin et al.
2020/0312194 A1 * 10/2020 Sandor ................... G09B 23/32
2021/0104180 A1 * 4/2021 Cole .................... G09B 23/303
2021/0272480 A1 * 9/2021 Yoneyama ........... G09B 23/303
2022/0107259 A1 * 4/2022 Hagan ..................... G01N 15/06
2023/0364451 A1 * 11/2023 Moran ................... A62B 27/00

FOREIGN PATENT DOCUMENTS

CN 206040050 U * 3/2017
CN 106652708 A * 5/2017
CN 107123354 A * 9/2017 ............. G09B 23/28
CN 107271337 A * 10/2017 ............. G01N 15/04
CN 206687709 U * 12/2017
CN 109272841 A * 1/2018 ........... G09B 23/288
CZ 302640 B6 8/2011
JP 2012024314 A * 2/2012
JP 2017158809 A * 9/2017
KR 20250020030 A * 2/2025 ........... A61B 1/2676
WO 2019109192 A1 6/2019

OTHER PUBLICATIONS

CN 206687709 U (Year: 2017).*
JP 2012024314 A (Year: 2012).*
JP 2017158809 A (Year: 2017).*
CA3024430A1 (Year: 2019).*
CN105427723A (Year: 2016).*
CN107123354A (Year: 2017).*
CN 106652708 A (Year: 2017).*
CN 109272841 A (Year: 2019).*
CN 206040050 U (Year: 2017).*
KR 20250020030 A (Year: 2025).*
International Search Report; International Application No. PCT/IN2020/050381; International Filing Date—Apr. 24, 2020; Date of Mailing—Sep. 23, 2020, 2 pages.
Written Opinion for International Application No. PCT/IN2020/050381; International Filing Date—Apr. 24, 2020; Date of Mailing—Sep. 23, 2020, 4 pages.
International Preliminary Report on Patentability; International Application No. PCT/IN2020/050381; International Filing Date—Apr. 24, 2020; Date of Issuance—Sep. 28, 2021; 5 pages.

* cited by examiner

METHODS AND SYSTEMS FOR SIMULATING DEPOSITION OF INHALED DRUG ON LUNGS

CROSS REFERENCE TO RELATED APPLICATIONS

This application is a National Stage application of PCT/IN2020/050381, filed Apr. 24, 2020. This application claims priority to India application Ser. No. 201921016322, filed Apr. 24, 2019, the entire contents of which are incorporated herein by reference.

FIELD OF THE INVENTION

The present disclosure generally relates to pharmacokinetics and more particularly, relates to simulating deposition of inhaled drug on lungs of an individual.

BACKGROUND OF THE INVENTION

As is generally known, administration of drugs by inhalation has been a widely popular treatment process for respiratory disorders, such as asthma and chronic obstructive pulmonary diseases. For example, antibiotics and other drugs have been administered as aerosols to treat pulmonary diseases in clinical set-ups. However, factors, such as aerosol delivery and lung deposition have proven to be major barriers in achieving a desired pharmacodynamics effect of the inhaled drugs. In fact, it has been found that the site of deposition in the lungs is influenced by physiology of an individual's lungs and aerosol properties, for example, particle size distribution.

Accordingly, continuous efforts are being made to improve delivery techniques and individual's breathing techniques in order to maximize an amount of the inhaled drug that actually is delivered to the lungs of the individual. Particularly, in the last few decades, significant growth and development has been witnessed in pharmacokinetic processes through in-silicosimulation. The in-silicosimulation techniques aim to assess, qualitatively as well as quantitatively, the pharmacokinetic processes to predict in-vivo performance of a drug, for example, in terms of deposition of the inhaled drugs on the lungs. However, in order to accurately predict clinical outcomes of inhalation of the drugs, it is relevant to achieve realistic in-vitro conditions, for example, simulating an accurate respiratory flow rate based on different individuals, such as children, healthy adults, and diseased adults.

Despite extensive use of the in-silico and in-vitro techniques in the current times, there are various shortcomings in predicting deposition of the inhaled drugs on the lungs. Accordingly, it is a challenge to predict quantity and pharmacodynamics effect of every dosage of any drug that is meant to be inhaled by individuals. This of course directly affects the development and evolution of the drugs as well.

SUMMARY OF THE INVENTION

This summary is provided to introduce a selection of concepts in a simplified format that are further described in the detailed description of the present disclosure. This summary is not intended to identify key or essential inventive concepts of the present disclosure, nor is it intended for determining the scope of the present disclosure.

In an embodiment of the present disclosure, an apparatus for simulating deposition of an inhaled drug on lungs of an individual is disclosed. The apparatus includes a mouth-throat model, an inhalation device connected to the mouth-throat model and adapted to disperse a drug in the mouth-throat model, and a breath simulator connected to the mouth-throat model and adapted to disperse a respiration flow in the mouth-throat model. The respiration flow is generated based on a respiration profile of the individual. Further, said apparatus includes a controlling unit in communication with the breath simulator and the inhalation device and adapted to detect the dispersion of the respiration flow into the mouth-throat model and actuate the inhalation device to disperse the drug in the mouth-throat mode, based on the detection. Furthermore, the apparatus includes a mixing inlet formed downstream to the mouth-throat model and the breath simulator, such that the respiration flow and the drug are uniformly mixed while passing through the mixing inlet. The apparatus also includes a lung cast model formed downstream to the mixing inlet and adapted to receive the mixture to accommodate deposition of the drug.

In another embodiment of the present disclosure, a system for simulating deposition of an inhaled drug on lungs of an individual is disclosed. The system includes a sensing unit 120 in communication with an inhalation device to detect at least one respiration parameter of the individual, wherein the at least one respiration parameter is detected when the individual inhales through the inhalation device. Further, the system includes a breath simulator in communication with the sensing unit 120 and adapted to disperse a respiration flow in the mouth-throat model, wherein the respiration flow is generated based on the at least one respiration parameter of the individual. The system also includes a controlling unit in communication with the breath simulator and the inhalation device, and adapted to detect the dispersion of the respiration flow by the breath simulator and actuate the inhalation device to disperse the drug in the mouth-throat model, based on the detection. The respiration flow and the drug are forwarded towards a lung cast model for deposition of the drug.

In yet another embodiment of the present disclosure, a method for simulating deposition of an inhaled drug on lungs of an individual is disclosed. The method includes steps of detecting at least one respiration parameter of the individual, wherein the at least one respiration parameter is detected when the individual inhales through an inhalation device. Further, the detecting step is followed by dispersing a respiration flow in a mouth-throat model, wherein the respiration flow is generated based on the at least one respiration parameter of the individual. Furthermore, the method includes detecting the dispersion of the respiration flow by the breath simulator and actuating the inhalation device to disperse the drug in the mouth-throat mode based on the detection, wherein the respiration flow and the drug are forwarded towards a lung cast model for deposition of the drug.

To further clarify advantages and features of the present disclosure, a more particular description of the disclosure will be rendered by reference to specific embodiments thereof, which is illustrated in the appended drawings. It is appreciated that these drawings depict only typical embodiments of the disclosure and are therefore not to be considered limiting of its scope. The disclosure will be described and explained with additional specificity and detail with the accompanying drawings.

BRIEF DESCRIPTION OF DRAWINGS

To further clarify advantages and features of the present disclosure, a more particular description of the disclosure will be rendered by reference to specific embodiments thereof, which is illustrated in the appended drawing. It is appreciated that these drawings depict only typical embodiments of the disclosure and are therefore not to be considered limiting its scope. The disclosure will be described and explained with additional specificity and detail with the accompanying drawings in which.

Figure 1:
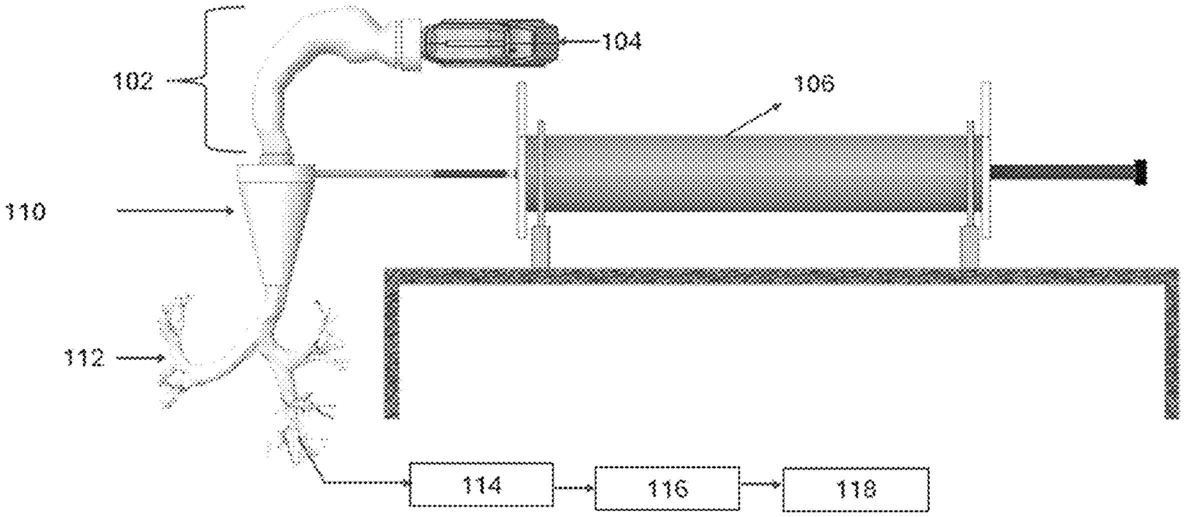
FIG. 1 illustrates a schematic view of an apparatus for simulating deposition of an inhaled drug on lungs of an individual, in accordance with an embodiment of the present disclosure, the figure shows 102, mouth throat model; 104, an inhalation device; 106, a breath simulator; 110, a mixing unit; 112, lung cast model; 114, flow regulator; 116, cascade impactor; and 118, vacuum pump

Further, skilled artisans will appreciate that elements in the drawings are illustrated for simplicity and may not have necessarily been drawn to scale. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF DRAWINGS

For the purpose of promoting an understanding of the principles of the invention, reference will now be made to the embodiment illustrated in the drawings, and specific language will be used to describe the same. It will nevertheless be understood that no limitation of the scope of the invention is thereby intended. Such alterations and further modifications in the illustrated system, and such further applications of the principles of the invention as illustrated therein would be contemplated as would normally occur to one skilled in the art to which the invention relates. Unless otherwise defined, all technical and scientific terms used herein have the same meaning as commonly understood by one of ordinary skilled in the art. The system, methods, and examples provided herein are illustrative only and are not intended to be limiting.

The term "some" as used herein is to be understood as "none or one or more than one or all." Accordingly, the terms "none," "one," "more than one," "more than one, but not all" or "all" would all fall under the definition of "some." The term "some embodiments" may refer to no embodiments or to one embodiment or to several embodiments or to all embodiments, without departing from the scope of the present disclosure.

The terminology and structure employed herein is for describing, teaching, and illuminating some embodiments and their specific features. It does not in any way limit, restrict or reduce the spirit and scope of the claims or their equivalents.

More specifically, any terms used herein such as but not limited to "includes," "comprises," "has," "consists," and grammatical variants thereof do not specify an exact limitation or restriction and certainly do not exclude the possible addition of one or more features or elements, unless otherwise stated, and furthermore must not be taken to exclude the possible removal of one or more of the listed features and elements, unless otherwise stated with the limiting language "must comprise" or "needs to include."

Whether or not a certain feature or element was limited to being used only once, either way, it may still be referred to as "one or more features" or "one or more elements" or "at least one feature" or "at least one element." Furthermore, the use of the terms "one or more" or "at least one" feature or element do not preclude there being none of that feature or element, unless otherwise specified by limiting language such as "there needs to be one or more . . . " or "one or more element is required."

Unless otherwise defined, all terms, and especially any technical and/or scientific terms, used herein may be taken to have the same meaning as commonly understood by one having ordinary skills in the art.

Reference is made herein to some "embodiments." It should be understood that an embodiment is an example of a possible implementation of any features and/or elements presented in the attached claims. Some embodiments have been described for the purpose of illuminating one or more of the potential ways in which the specific features and/or elements of the attached claims fulfill the requirements of uniqueness, utility and non-obviousness.

Use of the phrases and/or terms including, but not limited to, "a first embodiment," "a further embodiment," "an alternate embodiment," "one embodiment," "an embodiment," "multiple embodiments," "some embodiments," "other embodiments," "further embodiment", "furthermore embodiment", "additional embodiment" or variants thereof do not necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should not be necessarily taken as limiting factors to the attached claims. The attached claims and their legal equivalents can be realized in the context of embodiments other than the ones used as illustrative examples in the description below.

Embodiments of the present invention will be described below in detail with reference to the accompanying drawings.

The present disclosure provides an individual-specific apparatus, system and method for deposition of an inhaled drug on lungs of an individual. The present disclosure takes physiological parameters and respiration profiles of individuals into consideration. By doing so, the individual-specific apparatus is capable of differentiating between effects of the inhaled drug in different individuals, for example, in a healthy individual and in a diseased individual. Further, the present disclosure also facilitates effective and controlled deposition of the drug on the lungs, thereby enhancing the efficiency of the drug being administered.

Figure 2:
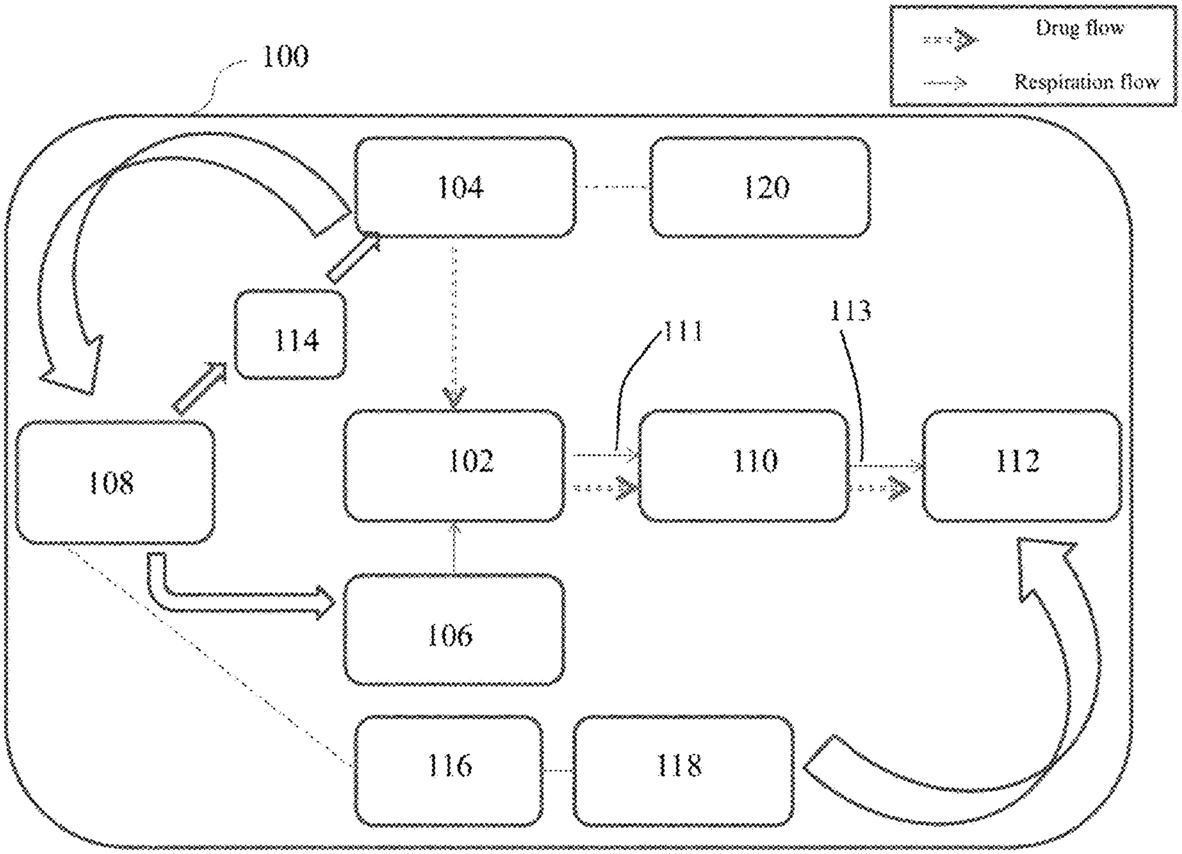
FIG. 2 illustrates a block diagram depicting the apparatus (100) and the various components of the apparatus, in accordance with another embodiment of the present disclosure, in addition to the parts numbered above the figure shows 108, a controlling unit; 118, vacuum pump, and 120, a sensing unit, 111 indicates flow between the mouth throat model and mixing unit; 113 indicates flow between the mixing unit and lung cast model.

FIG. 1 illustrates a schematic view of an apparatus for simulating deposition of an inhaled drug on lungs of an individual, in accordance with an embodiment of the present disclosure. Further, FIG. 2 illustrates a block diagram depicting various components of the apparatus 100, in accordance with another embodiment of the present disclosure. FIG. 2 also indicates the flow of fluid through the apparatus 100. In order to avoid duplicity of information, the description of FIG. 1 and FIG. 2 are explained in conjunction with each other.

Referring to FIG. 1 and FIG. 2, the apparatus 100 may include, but is not limited to, a mouth-throat model 102, an inhalation device 104 connected to the mouth-throat model 102, a breath simulator 106 connected to the mouth-throat model 102, a controlling unit 108 in communication with the breath simulator 106 and the inhalation device 104, a mixing unit 110 formed downstream to the mouth-throat model 102 and the breath simulator 106, and a lung cast model 112 formed downstream to the mixing unit 110.

In an embodiment, the mouth-throat model 102 may be indicative of mouth and throat for realistic and bio-relevant oral inhalation product testing of an individual. The mouth-throat model 102 may include oral cavity, pharynx, larynx, and a portion of the upper trachea. The mouth-throat model 102 may differ in the type of formulation, geometry, shape, and internal space volume, for example, based on one or more constituent factors. Such factors may include, but are not limited to, an age of the individual, a health state, and a gender. The mouth-throat model 102 is connected to the inhalation device 104.

Further, the inhalation device 104 may be adapted to disperse the drug in the mouth-throat model 102. Therefore, the drug is administered through the inhalation device 104 to be dispersed in the mouth-throat model 102. Since the inhalation device 104 enables delivery of the inhaled drug directly to the lungs of the individual, a smaller amount of drug is required for the effective treatment in comparison to administering through any other way. Further, the time taken in administration of the drug is also less through the present technique. In an embodiment, the inhalation device 104 may be one of a metered inhaler, a dry powder inhaler, and a soft mist inhaler. In another embodiment, the inhalation device 104 may be any other available inhaler used for administering drugs and delivering directly to the lungs of the individual.

Further, the mouth-throat model 102 may also be coupled with the breath simulator 106. The breath simulator 106 may be adapted to disperse a respiration flow in the mouth-threat model 102. In an embodiment, the respiration flow is generated based on a respiration profile of the individual. In an embodiment, the respiration flow may be indicative of a volumetric flow rate of the air being drawn into the mouth-throat model 102. As would be appreciated by a person skilled in the art, the respiration flow may differ from an individual to another, for example, based on differences in the respiration parameters and consequently the respiration profile.

In an embodiment, the apparatus 100 may include a sensing unit 120 in communication with the inhalation device 104. The sensing unit 120 may detect at least one respiration parameter of the individual. In an embodiment, the sensing unit 120 may detect the at least one respiration parameter, when the individual inhales through the inhalation device 104. In an embodiment, the respiration parameter may include, but is not limited to, a respiration flow rate, a total lung capacity, an effect of temperature, a humidity gradient, and mucosal layer in lung on respiration. In an embodiment, the sensing unit 120 may be in communication with the controlling unit 108.

Based on the respiration parameter, the controlling unit 108 may be adapted to generate the respiration profile of the individual. In an embodiment, the respiration profile may be indicative of a respiration rate of the individual. Further, the controlling unit 108 may transmit the generated respiration profile to the breath simulator 106 for generation and dispersion of the respiration flow in the mouth-throat model 102.

In an embodiment, the controlling unit 108 may be adapted to detect the dispersion of the respiration flow into the mouth-throat model 102. In an embodiment, the controlling unit 108 may include one or more sensors to detect the dispersion of the respiration flow into the mouth-throat model 102. Based on the detection, the controlling unit 108 may actuate the inhalation device 104 to disperse the drug into the mouth-throat model 102. In an embodiment, the controlling unit 108 may transmit a signal in response to the detection of respiration flow to actuate the inhalation device 104 in order to simultaneously disperse the inhaled drug into the mouth-throat model 102. On being actuated, the inhalation device 104 disperses the drug into the mouth-throat model 102 where the required flow of respiration has already been received by the breath simulator 106.

It is relevant to ensure that the respiration flow and the drug are adequately mixed before being introduced to the lung cast model 112. Therefore, the mixing unit 110 is formed downstream to the mouth-throat model 102 and the breath simulator 106 such that the respiration flow and the drug are uniformly mixed while passing through the mixing unit 110. In an embodiment, the mixing unit 110 may have a mixing inlet 111 and a mixing outlet 113. The dispersed drug and the respiration flow are transmitted from the mouth-throat model 102 to the mixing unit 110 through the mixing inlet 111. The mixing unit 110 may have a profile that provides for uniform mixing of the respiration flow with the dispersed drug, and therefore, the mixture leaving the mixing unit 110 at the mixing outlet 113 is a uniform mixture of the respiration flow and the inhaled drug.

The lung cast model 112 may be adapted to receive the uniform mixture of the respiration flow and the inhaled drug for accommodating the deposition of the drug. The lung cast model 112 is therefore formed such that a deposition pattern is similar to an actual lung deposition of the drug on the lungs of an individual.

In an embodiment, the lung cast model 112 may be formed based on at least one physiological parameter and the respiration profile of the individual. Therefore, the lung cast model 112 may be made individual-specific. In such an embodiment, the physiological parameters affecting the lung-cast model 112 may include, but are not limited to a breathing frequency of the individual, a tidal volume or the volume of air exhaled in one inspiration or expiration, ventilation or the volume of air inhaled or exhaled from the individual's lungs, a vital capacity or the maximum amount of air the individual can expel from the lungs after a maximum inspiration, an oxygen uptake, carbon dioxide production, and respiratory exchange equivalent for oxygen. In another embodiment, the physiological parameters of the individual may be determined by High Resolution Computed Tomography (HRCT), and scan of lungs of the individual.

In an embodiment, the apparatus 100 may further include a flow regulator 114 in communication with the inhalation device 104 and the controlling unit 108. The flow regulator 114 is adapted to regulate a flow rate of the inhaled drug dispersed in the mouth-throat model 102. In an embodiment, the controlling unit 108 may detect the flow of the drug from the inhalation device 104 and accordingly transmit a signal to the flow regulator 114. The flow regulator 114 may have control valves that normally respond to signals generated and transmitted by the controlling unit 108 for controlling the flow rate of the inhaled drug. In an example, the flow regulator 114 may be a Critical Flow Controller Model TPK. In an embodiment, the performance of the flow regulator 114 may be affected by the resistance to flow posed by the inhalation device 104, a flow rate of the drug, a duration of inspiration, and stability of the flow rate of the drug.

In an embodiment, the apparatus 100 may also include a cascade impactor 116 in communication with the lung cast model 112 and the controlling unit 108. The cascade impactors 116 may be adapted to evaluate parameters associated with the deposition of the drug on the lung cast model 112. The parameters associated with the deposition include at least one of actual consumption of the drug at a particular lung area upon the deposition and a particle size distribution of the respiration flow and the drug. In an embodiment, the cascade impactor 116 may be measurement-related devices.

In an embodiment, the cascade impactor 116 may classify particles present in the mixture of the drug and the respiration flow by drawing the mixture through a cascade of progressively finer nozzles. The jest from these nozzles impact on plane sampling surfaces and at each stage of the nozzles, may collect finer particles than its predecessor stage. The collected samples may then be analyzed for obtaining the amount of drug deposited on each stage.

In a further embodiment, the deposition of the inhaled drug on the lung cast model 112 may be evaluated by a High-Performance Liquid Chromatography (HPLC) technique. The HPLC technique is used to separate, identify, and quantify each component in a mixture. The cascade impactor 116 may include pumps adapted to pass the pressurized mixture through a column filled with a solid adsorbent material. Each component in the mixture may interact slightly differently with the adsorbent material, thereby leading to different flow rates for the different components and separation of the components while flowing out of the column. In another embodiment, the HPLC instrument may include, but is not limited to, a degasser, a sampler, pumps, and a detector. The sampler may bring the mixture into a mobile phase stream which may carry it to the column. The pumps may deliver the desired flow and composition of the mobile phase through the column. The detector may generate a signal proportional to the amount of mixture emerging from the column, thereby allowing for quantitative analysis of the mixture components.

In a further embodiment, a plume visualization device may be included to characterize plume intensity and particle behavior of the inhaled drug by using a Particle Image Velocimetry (PIV) or a Phase Doppler Interferometry (PDI) technique. In the PIV technique, light scattering particles are added and a laser beam is formed into a light sheet illuminating the light scattering particles. In the PDI technique, measurement of velocity in dynamic experiments with a high temporal resolution is allowed. As would be understood, the HPLC technique, the PVI technique, and the PDI technique may allow assessment of the deposition of the inhaled drug on the lung cast model 112.

In an embodiment, the cascade impactor 116 may include, but is not limited to, a Next Generation Impactor (NGI). The NGI may be adapted to analyze cell permeation of the inhaled drug on the lungs by using at least one of calu-3 cell and A549 cell culture. In an embodiment, Computational Fluid Dynamic (CFD) models may be integrated with the apparatus 100 for an improved assessment of the deposition of the inhaled drug on the lung cast model 112.

Further, the apparatus 100 may include a vacuum pump 118 disposed between the cascade impactor 116 and the lung cast model 112. The vacuum pump 118 may be adapted to draw the respiration flow and the drug through the cascade impactor 116 for evaluation. The vacuum pump 118 may enhance the performance of the cascade impactor 116 by rapidly drawing the mixture through it, thereby increasing the efficiency and speed of the evaluation of the parameter associated with the deposition of the drug on the lung cast model 112.

Figure 3:
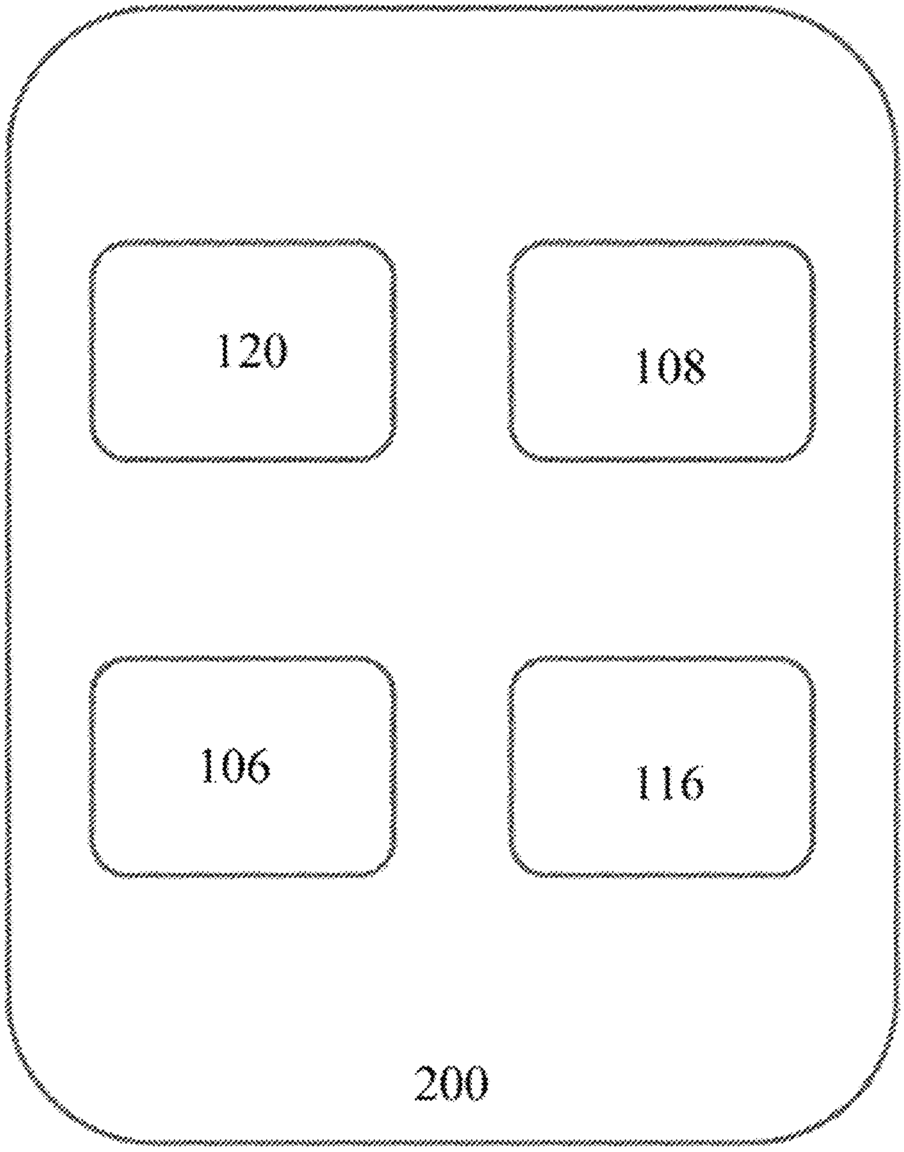
FIG. 3 illustrates a block diagram of a system (200) of the apparatus for simulating deposition of the inhaled drug, in accordance with another embodiment of the present disclosure.

In an embodiment, the sensing unit 120, the breath simulator 106, the controlling unit 108, and the cascade impactor 116 form a system of the apparatus 100. FIG. 3 illustrates a block diagram of the system 200, in accordance with another embodiment of the present disclosure. The system 200 may be implemented in the apparatus 100 for simulating the deposition of the drug on the lungs of the individual. The constructional and operational details of the components of the system 200 are already explained in the description of FIG. 1 and FIG. 2.

Figure 4:
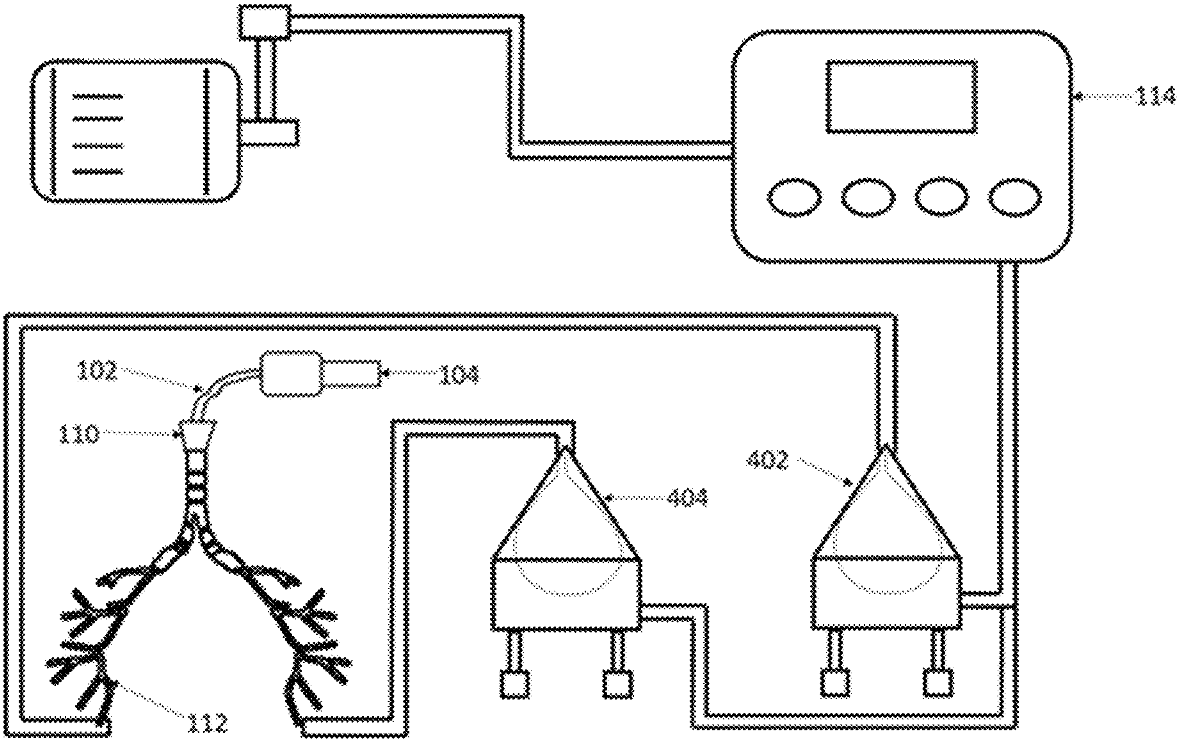
FIG. 4 illustrates the apparatus, according to an embodiment of the present disclosure, in addition to the parts numbered above the figure shows 402, left lobe mimic, and 404, right lobe mimic.

FIG. 4 illustrates the apparatus 100, according to an embodiment of the present disclosure. Referring to FIG. 4, the apparatus 100 may include, but is not limited to the lung cast model 112 connected to a left lobe mimic 402 and a right lobe mimic 404. In an embodiment, the lobe mimics 402, 404 may be metallic dome units containing a filter, wherein the capacity of the filter may be 0.1 micron. Further, the lobe mimics may also include an expandable balloon that may be made of one or more biocompatible materials. In an embodiment, the expandable balloons may be adapted to expand during the suction from the pump to known and predefined volumes. Said volumes mimic the actual patient inhalation pattern and the contribution of the left and right lung lobes in that patient respectively.

In an example, if a patient A has inhalation flow rate of peak 60 Liters Per Minute (LPM) and volume of inspiration of 2 L, the contribution of the left and right lobe may not be identical. In a particular instance, the contribution of the left lobe may be 40% while the contribution of the right lobe may be 60% owing to the physiology of the lung cast model. In this case, the left lobe mimic balloon expands by 800 ml while right lobe mimic expands by 1200 ml to form a complete inhalation. Further, the rate of expansion varies according to the physiology of the lung cast model. Therefore, in the same example, if the patient A has 45% contribution to the flow rate from left lobe, the rate of expansion of the balloon in the left lobe mimic may be 21 LPM while that of balloon in the right lobe mimic 404 may be 39 LPM.

In an embodiment, post performing the above experiment, the two metallic dome units indicating the left lobe mimic 402 and the right lobe mimic 404, are dismantled using a handle that may be provided on top of the left lobe mimic 402 and the right lobe mimic 404. In an embodiment, the balloon and filter unit (of FIG. 4) may be analyzed by chromatography in order to determine the amount of drug deposited on either lobe 402, 404.

Figure 5:
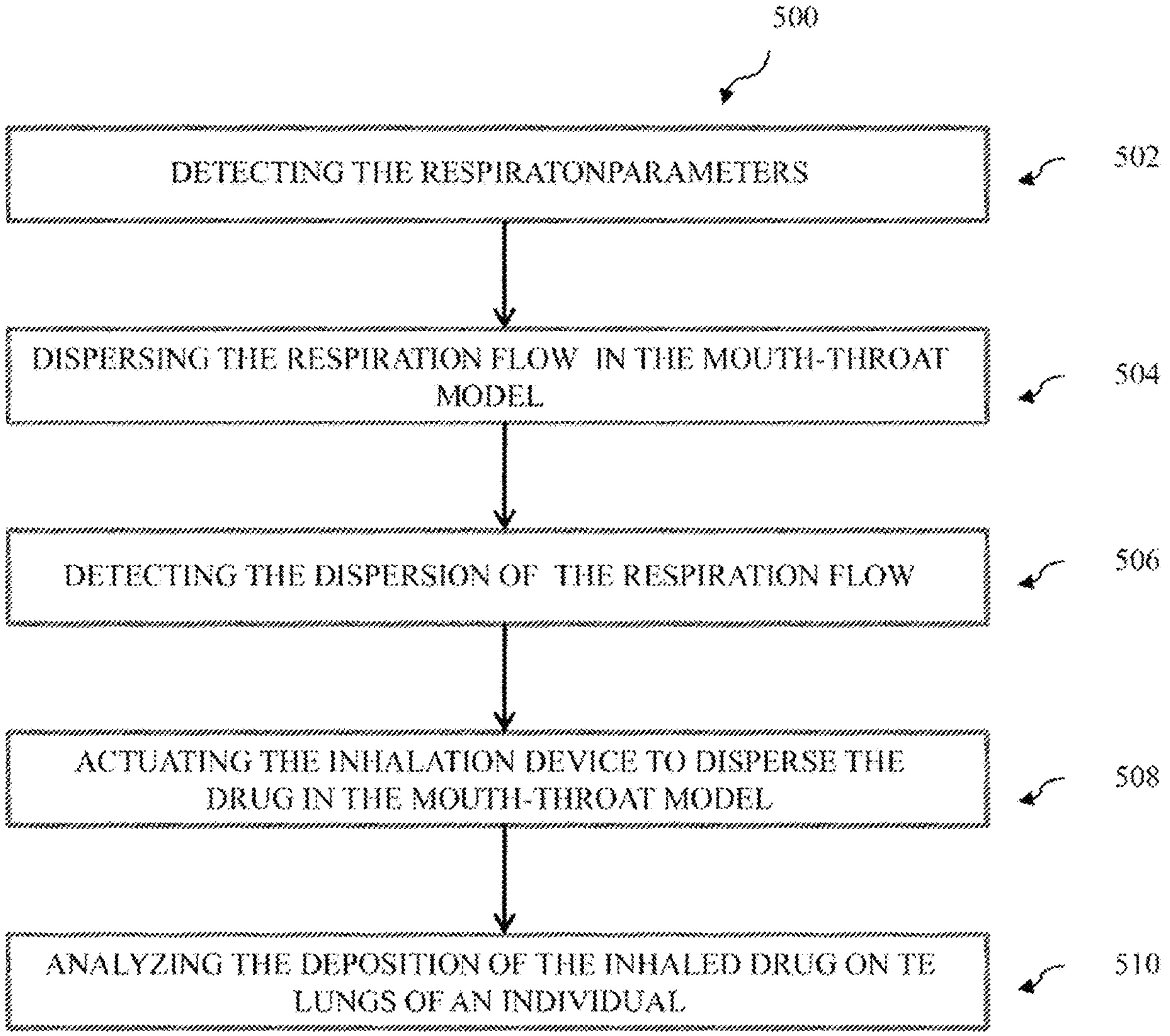
FIG. 5 illustrates a flow diagram depicting a method for simulating deposition of the inhaled drug on the lungs, in accordance with an embodiment of the present disclosure.

FIG. 5 illustrates a flow diagram depicting a method 500 for simulating deposition of the inhaled drug on the lungs, in accordance with an embodiment of the present disclosure. In an embodiment, the method 500 may be a computer-implemented method 500. In an embodiment, the method 500 may be executed by the system 200. Further, for the sake of brevity, features of the present disclosure that are explained in details in the description of FIG. 1, FIG. 2, FIG. 3, and FIG. 4, are not explained in detail in the description of FIG. 5.

At a step 502, the method 500 includes detecting the respiration parameter of the individual. The respiration parameter is detected when the individual inhales through the inhalation device 104. In an embodiment, the sensing unit of the apparatus 100 may detect the respiration parameter.

Further, at a step 504, the method 500 includes dispersing the respiration flow in the mouth-throat model 102. The respiration flow may be generated based on the respiration parameter of the individual. In an embodiment, the breath simulator 106 of the apparatus 100 disperses the respiration flow in the mouth-throat model 102.

In an embodiment, the method 500 may include receiving details relating to the at least one respiration parameter of the individual, and generating the respiration profile of the individual based on the at least one respiration parameter. Subsequently, the respiration profile may be transmitted to the breath simulator 106 for generation of the respiration flow.

At a step 506, the method 500 includes detecting the dispersion of the respiration flow by the breath simulator 106. In an embodiment, the controlling unit 108 of the apparatus 100 may detect the dispersion of the respiration flow.

At a step 508, the method 500 includes actuating the inhalation device 104 to disperse the drug in the mouth-throat mode 102. In an embodiment, the controlling unit 108 may actuate the inhalation device 104.

In an embodiment, the method 500 may include evaluating the parameters associated with the deposition of the drug on the lung cast model 112 and thereby analyzing the deposition of the inhaled drug on the lung cast model. In an embodiment, the cascade impactor 116 may evaluate the parameters.

As can be gathered, the present disclosure provides a comprehensive approach for simulating deposition of an inhaled drug on lungs of an individual. Firstly, the apparatus 100 has the capability of maneuvering the operating conditions of inhalation based on different individuals. Considering the simulation of the respiration flow, the apparatus 100 has the flexibility of changing the operating parameters of the testing process to comprehensively analyze the outcome of the drug inhalation on different individuals. Also, the apparatus 100 is a compact apparatus allowing convenient handling, maintenance, and operation. The lung cast model 112 of the present disclosure is formed so as to facilitate replication of real-life conditions for ensuring accuracy of the overall analysis. Additionally, the flow regulator 114 may optimize the performance of the apparatus 100, relying on the flow of the drug dispersion.

Therefore, the apparatus 100, the system 200, and the method 500 facilitate effective and controlled deposition of the drug on the lungs of an individual, thereby enhancing the efficiency of the action of the drug being administered. The present disclosure provides an individual-specific system for the deposition of an inhaled drug on the lungs of the individual. It takes into account the physiological parameters and respiration profiles of individuals. It is also capable of differentiating between effect of the inhaled drug in a healthy individual and in a diseased individual. In an example, an individual who is 80 years old or the one suffering from chronic breathing problem may administer drug based on their respiration profile which may be different from others. This will ensure better deposition of the drug on the lungs of the individual and thereby enhancing the therapeutic results of the drug. Therefore, the apparatus 100, the system 200, and the method 500 of the present disclosure are comprehensive, flexible, accurate, compact, and ensures individual-specific analysis for the drug inhalation.

The figures and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the embodiments is by no means limited by these specific examples. Numerous variations, whether explicitly given in the specification or not, such as differences in structure, dimension, and use of material, are possible. The scope of the embodiments is at least as broad as given by the following claims.

We claim:

1. An apparatus for simulating deposition of an inhaled drug on lungs of an individual, the apparatus comprising:

a mouth-throat model;

an inhalation device connected to the mouth-throat model and adapted to disperse a drug in the mouth-throat model;

a breath simulator connected to the mouth-throat model and adapted to disperse a respiration flow in the mouth-throat model, wherein the respiration flow is generated based on a respiration profile of the individual;

a controlling unit in communication with the breath simulator and the inhalation device, wherein the controlling unit comprises one or more sensors, wherein the controlling unit is configured to:

detect the dispersion of the respiration flow into the mouth-throat model;

transmit a signal to the inhalation device in response to the detection;

actuate the inhalation device to disperse the drug in the mouth-throat model, in response to the transmission of the signal;

a mixing unit comprising a mixing inlet and a mixing outlet, wherein the mixing inlet is formed fluidly downstream from both the mouth-throat model and the breath simulator, and wherein the mixing unit provides a uniform mixing of the respiration flow and the drug;

a lung cast model connected to the mixing unit and adapted to receive a mixture of the respiration flow and the drug to accommodate deposition of the drug, wherein the lung cast model connected to a left lobe mimic and a right lobe mimic, each lobe mimic is a metallic dome unit comprising a filter, and an expandable balloon configured to expand during suction to predefined volumes to mimic an inhalation pattern of the individual and contribution of the respective left and right lobes of the individual; and a sensing unit in communication with the inhalation device and adapted to detect at least one respiration parameter of the individual, wherein the at least one respiration parameter is detected when the individual inhales through the inhalation device wherein the at least one respiration parameter comprises a respiration flow rate, a total lung capacity, an effect of temperature, a humidity gradient, and a mucosal layer in lung on respiration, and wherein the controlling unit is in communication with the sensing unit and is adapted to:

generate the respiration profile of the individual, based on at least one respiration parameter; and transmit the respiration profile to the breath simulator for generation of the respiration flow.

2. The apparatus of claim 1, wherein the lung cast model is formed based on at least one physiological parameter and the respiration profile of the individual.

3. The apparatus of claim 1, further comprising a flow regulator in communication with the inhalation device and the controlling unit, and adapted to regulate a flow rate of the inhaled drug dispersed in the mouth-throat model.

4. The apparatus of claim 1, further comprising a cascade impactor in communication with the lung cast model and the controlling unit, and adapted to evaluate parameters associated with the deposition of the drug on the lung cast model.

5. The apparatus of claim 4, wherein the parameters associated with the deposition comprise at least one of a consumption of the drug at a particular lung area upon the deposition and a distribution of particles present in the mixture of the respiration flow and the drug.

6. The apparatus of claim 4, further comprising a vacuum pump adapted to draw the respiration flow and the drug through the cascade impactor.

7. A system for simulating deposition of an inhaled drug on lungs of an individual, the system comprising:

a sensing unit in communication with an inhalation device and adapted to detect at least one respiration parameter of the individual, wherein the at least one respiration parameter is detected when the individual inhales through the inhalation device wherein the at least one respiration parameter comprises a respiration flow rate, a total lung capacity, an effect of temperature, a humidity gradient, and a mucosal layer in lung on respiration;

a breath simulator in communication with the sensing unit and adapted to disperse a respiration flow in a mouth-throat model, wherein the respiration flow is generated based on the at least one respiration parameter of the individual;

a controlling unit in communication with the breath simulator and the inhalation device, wherein the controlling unit comprises one or more sensors, and wherein the controlling unit is configured to:

detect the dispersion of the respiration flow into the mouth-throat model;

transmit a signal to the inhalation device in response to the detection;

actuate the inhalation device to disperse the drug in the mouth-throat model in response to the transmission of the signal; and a mixing unit comprising a mixing inlet and a mixing outlet, wherein the mixing inlet is formed fluidly downstream from both the mouth-throat model and the breath simulator and wherein the mixing unit provides a uniform mixing of the respiration flow and the drug; and a lung cast model connected to the mixing unit and adapted to receive a mixture of the respiration flow and the drug to accommodate deposition of the drug, wherein the lung cast model connected to a left lobe mimic and a right lobe mimic, each lobe is a metallic dome unit comprising a filter, and an expandable balloon configured to expand during suction to predefined volumes to mimic an inhalation pattern of the individual and contribution of the respective left and right lung lobes of the individual, wherein the controlling unit is in communication with the sensing unit and is configured to:

receive details relating to the at least one respiration parameter;

generate a respiration profile of the individual, based on the at least one respiration parameter; and transmit the respiration profile to the breath simulator for generation of the respiration flow.

8. The system of claim 7, further comprising a cascade impactor in communication with the lung cast model and the controlling unit, and adapted to evaluate parameters associated with the deposition of the drug on the lung cast model.

9. The system of claim 8, wherein the parameters associated with the deposition comprise at least one of a consumption of the drug at a particular lung area upon the deposition and a distribution of particles present in the mixture of the respiration flow and the drug.

10. A method for simulating deposition of an inhaled drug on lungs, the method comprising:

detecting, by a sensing unit, at least one respiration parameter of an individual, wherein the at least one respiration parameter is detected upon inhalation of the drug through an inhalation device;

dispersing, by a breath simulator, a respiration flow in a mouth-throat model, wherein the respiration flow is generated based on the at least one respiration parameter of the individual wherein the at least one respiration parameter comprises a respiration flow rate, a total lung capacity, an effect of temperature, a humidity gradient, and a mucosal layer in lung on respiration;

detecting, by a controlling unit, the dispersion of the respiration into the mouth-throat model;

transmitting, by the controlling unit, a signal to the inhalation device in response to the detection;

actuating, by the controlling unit, the inhalation device to disperse the drug in the mouth- throat model in response to the transmission of the signal;

mixing, by a mixing unit, the respiration flow and the drug, wherein the mixing unit comprises a mixing inlet and a mixing outlet formed fluidly downstream from both the mouth- throat model and the breath simulator, and wherein the mixing unit provides a uniform mixing of the respiration flow and the drug;

receiving, by a lung cast model connected to the mixing unit, a mixture of the respiration flow and the drug to accommodate deposition of the drug, wherein the lung cast model connected to a left lobe mimic and a right lobe mimic, each lobe is a metallic dome unit comprising a filter, and an expandable balloon configured to expand during suction to predefined volumes to mimic an inhalation pattern of the individual and contribution of the respective left and right lung lobes of the individual; and analyzing deposition of the inhaled drug on the lungs.

11. The method of claim 10, further comprising evaluating, by a cascade impactor, parameters associated with the deposition of the drug on the lung cast model.

12. The method of claim 10, further comprising:

receiving, by the controlling unit, details relating to the at least one respiration parameter;

generating, by the controlling unit, a respiration profile of the individual, based on the at least one respiration parameter; and transmitting, by the controlling unit, the respiration profile to the breath simulator for generation of the respiration flow.

13. The method of claim 10, further comprising analyzing distribution of the inhaled drug between the lungs.

* * * * *